United States Patent [19]

Helwig, Jr.

[11] 4,180,744
[45] Dec. 25, 1979

[54] ENERGY MANAGEMENT SYSTEM

[75] Inventor: William F. Helwig, Jr., Downers Grove, Ill.

[73] Assignee: Avtec Industries, Inc., Downers Grove, Ill.

[21] Appl. No.: 822,543

[22] Filed: Aug. 8, 1977

[51] Int. Cl.² .................................. H02J 3/14
[52] U.S. Cl. ........................... 307/39; 307/35; 307/126; 340/147 R
[58] Field of Search .............. 307/39, 38, 41, 34, 307/35; 340/166 R, 147 R

[56] References Cited

U.S. PATENT DOCUMENTS

| | | | |
|---|---|---|---|
| 2,771,558 | 11/1956 | Young | 307/35 |
| 3,496,337 | 2/1970 | Voglesonger | 307/41 |
| 3,573,576 | 4/1971 | Nakabo | 307/38 |
| 3,825,824 | 7/1974 | Herron | 340/166 R |
| 4,064,485 | 12/1977 | Leyde | 307/39 |

Primary Examiner—L. T. Hix
Assistant Examiner—S. D. Schreyer
Attorney, Agent, or Firm—Edward D. Gilhooly

[57] ABSTRACT

An energy management system for limiting continuously instantaneous permissible power level of a plurality of controllable loads including a transducer device for generating an output signal when the measured instantaneous power level exceeds a pre-set instantaneous permissible power level. A programmable matrix device is provided to select a plurality of controllable loads and periods of time in a day for which each of the selected loads are connected to a power source. The selected controllable loads are disconnected from the power source in response to the output signal in a predetermined order. The order in which the selected loads are to be disconnected is sequentially switched over a certain time interval.

22 Claims, 2 Drawing Figures

ENERGY MANAGEMENT SYSTEM

BACKGROUND OF THE INVENTION

This invention relates generally to an electrical apparatus for automatically controlling peak demands and more particularly, it relates to an energy management system for limiting continuously the consumption of energy and leveling peak electrical demands in industrial plants, restaurants, and the like.

It is generally well known that central power stations or generation plants are opposed to peak load conditions caused by increased usage of power by its large number of customers since a greater amount of the installed capacity is required to accommodate the increased power demands occurring at that given time. In order to encourage its customers to limit or lower their power levels on demand, it has been generally noted that power stations apply a demand charge in addition to a regular schedule of rates for the energy utilized. In order to determine such demand charge, a maximum demand level meter is employed for indicating the maximum amount of energy consumption (highest average kilowatt demand) over any pre-determined interval, i.e., 15 or 30 minute time period. This is commonly referred to as "demand metering". Of course, this period of time varies depending upon the individual utility companies. The demand charge can sometimes add as much as 50 percent to the total cost of the electricity.

To maintain the electric charges at a reasonable level, it is necessary to keep the power demand level below a pre-determined maximum value. In many typical cases, a customer's power level can be separated into a base load and a controllable load. The base load is one which should not be dropped such as process loads in industrial plants. A controllable load is one that may be dropped for a momentary interval of time without any inconvenience, such as lighting, heating and cooling loads.

It would, therefore, be desirable to provide an energy management system for limiting continuously the consumption of energy and leveling of peak demands by disconnecting from a power source a plurality of individual equipment or controllable loads in a pre-selected pattern when the total load demand exceeds a pre-set limit. This system would permit selective limiting or disconnection from the power service on a non-priority basis of the various controllable loads. That is, no one individual equipment or controllable load in a restaurant would always be the first one to be dropped. Thus, new maximum demands are prevented from occurring thereby preventing a higher demand charge to effect dollar savings and maximum operating efficiency.

Further, it has been experienced that in typical commercial facilities utilized only during normal working hours in the day, the peak demands usually occur during the early morning hours when facilities are starting up. At other times during the day or in the night, the demand may not be as high. Thus, it would also be desirable to provide an energy management system with programmable means to enable a consumer to select the controllable loads and the periods of time in a day in which each of the controllable loads are connected to the power station. This would allow the consumer to maintain his permissible maximum demand to a lower value, thereby reducing further the utility charges and increasing the operational efficiency.

SUMMARY OF THE INVENTION

Accordingly, it is a general object of the present invention to provide an improved energy management system which has all of the aforementioned features.

It is an object of the present invention to provide a new and improved apparatus for limiting continuously the consumption of energy to a pre-determined maximum peak demand level.

It is another object of the present invention to provide an apparatus for controlling the consumption of energy and leveling of peak demands by disconnecting from a power source a plurality of controllable loads in a pre-selected order when the total load demand exceeds a given limit.

It is another object of the present invention to provide an apparatus for shedding various controllable loads in restaurants and the like on a non-priority basis.

It is still another object of the present invention to provide an energy management system having programmable means for selecting controllable loads and periods of time in a day in which each of the controllable loads are connected to a power source.

It is still yet another object of the present invention to provide an energy management system for limiting continuously the consumption of energy by sequentially disconnecting and reconnecting a plurality of controllable loads to a power source on a non-priority basis.

In accordance with these aims and objectives, the present invention is concerned with the provision of an energy management system for limiting continuously instantaneous permissible power demand of a plurality of controllable loads. This system includes a transducer device for generating an output signal when a measured power demand exceeds a pre-set instantaneous permissible power demand. A programmable matrix device is provided for selecting a plurality of controllable loads and periods of time in a day for which each of the selected loads are connected to a power source. The selected loads are disconnected from the power source in response to the output signal in a predetermined order. The order in which the selected loads are to be disconnected is sequentially switched over a certain time interval.

Indicating means are provided for visually displaying the operative condition of the system. It indicates whether the selected loads are connected to the power source and whether it has been disconnected due to an excessive power demand. Further, a plurality of time delay relays which are responsive to the transducer output signal are utilized for sequentially shedding the selected controllable loads. The instant invention is particularly efficient and economical in providing an energy management system for limiting continuously the consumption of energy since it both allows programming of the on-time of selected controllable loads and disconnecting of the controllable loads when an instantaneous permissible power demand is exceeded.

BRIEF DESCRIPTION OF THE DRAWING

These and other objects and advantages of the present invention will become more fully apparent from the following detailed description when read in conjunction with the accompanied drawing (FIGS. 1 and 2) in which there is shown a schematic circuit diagram of the energy management system according to the instant invention for limiting continuously the consumption of energy in a plurality of controllable loads.

DETAILED DESCRIPTION OF THE PREFERRED EMBODIMENT

Figure 1:
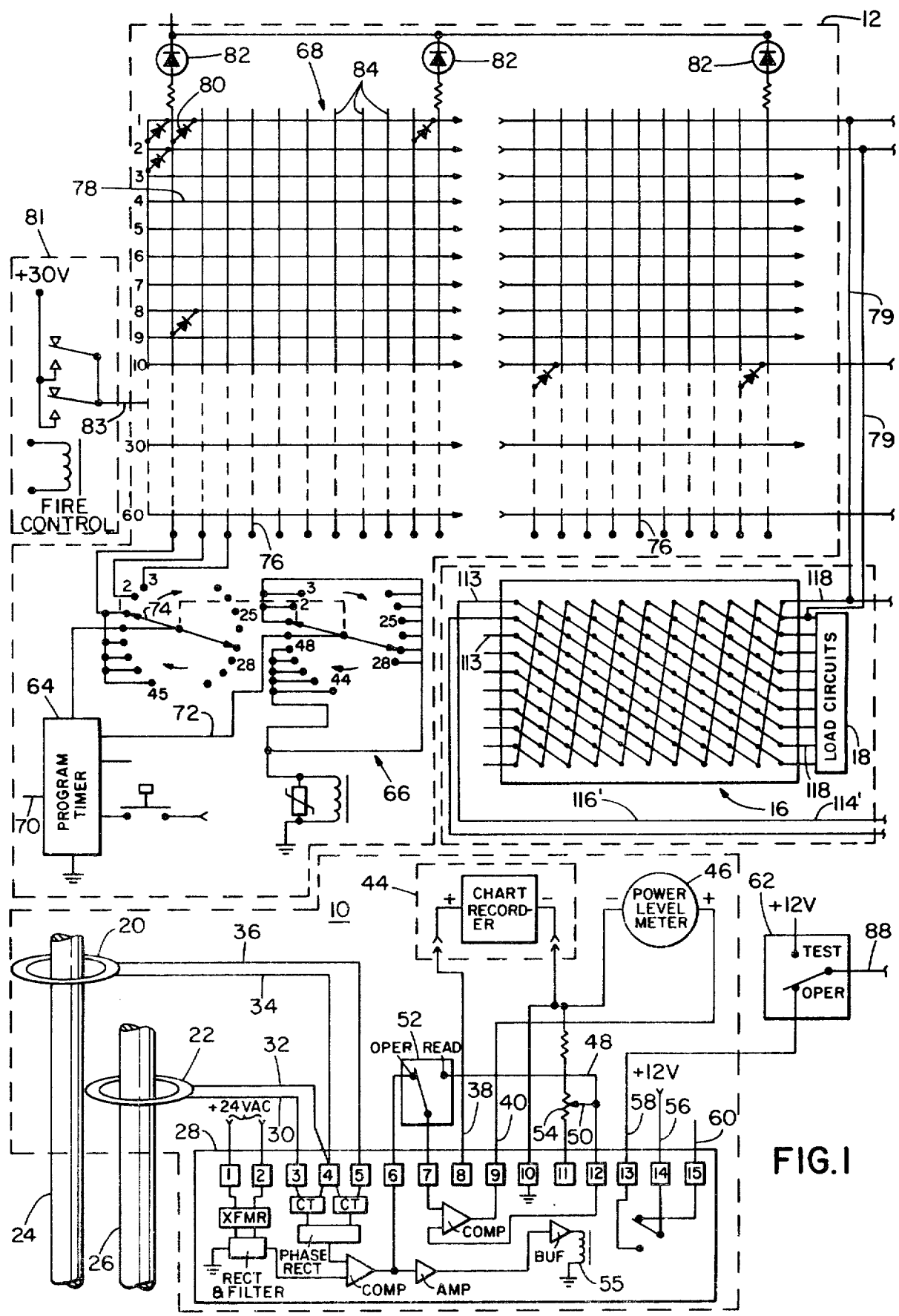

Referring now to the drawing, the energy management system of the present invention comprises a transducer device 10 a programmable matrix device 12, means for sequentially disconnecting and reconnecting loads designated generally by 14, a rotary switching device 16, and a plurality of controllable loads circuits 18.

The transducer 10 (FIG. 1) includes current transformers 20 and 22 connected to two phases of a three-phase power service bus lines 24, 26 respectively and a converter 28. The output of the secondary windings of the current transformers 20, 22 are connected to the input of the converter 28 via leads 30-36. The converter 28 measures continuously the instantaneous power level or demand and transforms the AC current signals into a direct current signal output on leads 38, 40, and 42, whose magnitude is proportional to the instantaneous power consumed by the load circuits 18. The signal output on lead 38 drives a chart recorder 44 for recording the power level output, and the signal output on lead 40 drives a power level meter 46 to indicate the instantaneous power consumed. The output lead 42 is connected to "OPERATE" position of a push-button switch 52. The meter may be selected to "Read" from 0-5000 kilo-watt hours full-scale. The lead 48 is coupled to the "Read" position of the switch 52 so that when the switch is turned to the "Read" position, the meter 46 can be pre-set to a desired trip level or value of the permissible load demand which is not to be exceeded via wiper 50 of variable resistor 54.

The transducer 10 is also provided with an internal relay 55 having its contacts brought out on leads 56, 58, and 60. The lead 56 is connected to the common of the relay and is supplied to a +12 V externally. The lead 58 is coupled to the normally opened contact of the relay 55 and to the "OPERATE" position of a demand test switch 62. The lead 60 is tied to the normally closed contact of the relay 55. Under normal operating conditions, the lead 58 is not connected to the +12 V on the common as the relay 55 is de-energized. When the measured instantaneous power level exceeds the pre-set trip level, the relay 55 in the converter 28 will become energized to close the normally opened contact and +12 V will be supplied on the lead 58 to activate the disconnecting and reconnecting means 14 via the test switch 62. The test switch 62 can be turned manually to the "test" position to simulate an excessive instantaneous power level for checking the operation of the disconnecting and reconnecting means 14.

Figure 2:
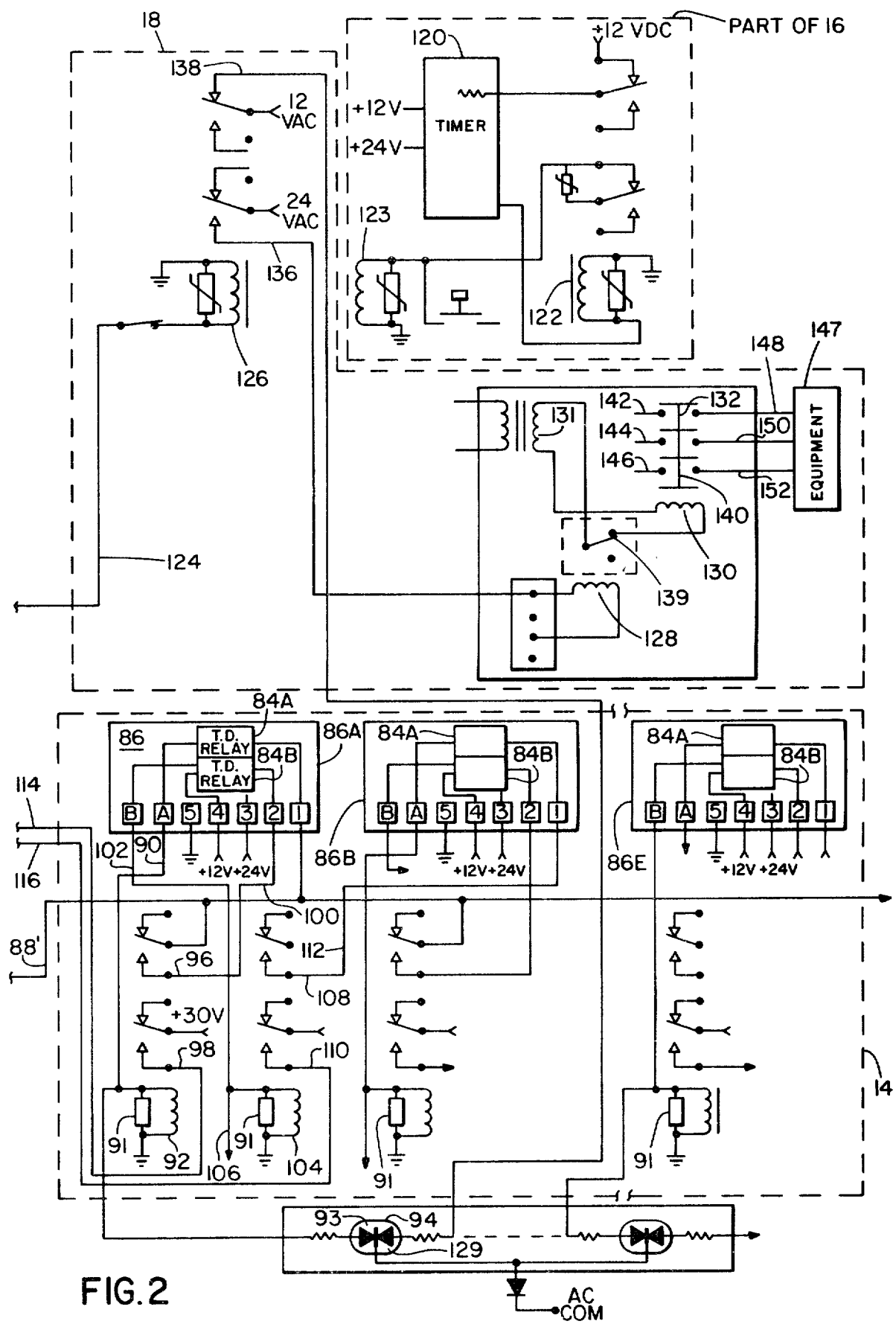

The programmable matrix device 12 comprises a program time 64, a stepper switch indicated generally as 66, and a programmable diode matrix 68. The timer 64 has its input on lead 70 from a 50 or 60 hertz source to provide a pulse on its output lead 72 every fifteen or thirty minutes. The stepper switch 66 is shown for the embodiment illustrated with forty-eight positions. Each time a thirty minute pulse is received by the stepper switch 66, its wiper 74 will be advanced sequentially one position. The wiper 74 is connected to a positive voltage of sufficient magnitude to energize diodes in the matrix 68 and a relay 126 (FIG. 2) in the load circuits 18, which will be discussed more fully hereinafter. Since there are forty-eight positions on the stepper switch 66, it will take 24 hours or one day for the wiper 74 to progress through the entire sequence of positions and return to its initial starting point.

Thus, the forty-eight positions of the switch 66 can be chosen to correspond to a particular half-hour interval of time in a day and are connected to respective vertical time-lines in a 76 of the matrix 68. The matrix 68 is also provided with a plurality of horizontal equipment-lines 78. Each of the equipment-lines 78 is connected to a different one of the plurality of load circuits 18 via leads 79. In this illustration, it can be seen that sixty equipment-lines are depicted and labeled with reference numbers 1-60. It should be apparent to those skilled in the art that any number, more or less, of equipment-lines 78 could be used as desired. In order to maintain simplicity, only one load circuit 18 has been shown in detail which is connected to the first equipment-line 78. To select and program which of the load circuits 18 coupled to the various equipment-lines 78 are to be connected to a power source and the periods of time in a day for which each of the load circuits 18 are to be connected to the power source, diodes are connected so that its cathode is tied to the equipment-line 78 corresponding to the particular load circuit 18 not desired to be coupled to the power source and its anode is tied to the vertical time-line 76 corresponding to the time in which it is to be disconnected. For example, assuming that the first vertical line corresponds to the time of 12-midnight (0000 hrs.), diode 80 will cause the first load circuit 18 via the first equipment-line 78 to be disconnected from the power source between 12-midnight and 12:30 a.m. In this manner, it is possible to select or program what portion of a day each of the load circuits are connected or disconnected to the power source.

The programmable diode matrix 68 is further provided with an indicating means, such as a plurality of light-emitting diodes 82 connected to the upper ends 84 of the vertical time-lines 76. One of the diodes 82 will always be activated depending on the time of day to visually display the operative condition of the matrix. A fire control circuit 81 may also be coupled to the matrix 68 so that, upon the occurrence of a fire, a signal will appear on the lead 83 to cause disconnection of all of the various controllable loads 18.

The means 14 (FIG. 2) for sequentially disconnecting and reconnecting the loads circuits 18 comprises a plurality of elements 86 each housing a pair of time delay relays 84A, and 84B. The time delay relays are both delayed on pull-in and on drop-out. The delay time on pull-in on each of the relays 84A and 84B is more or less 5-seconds and the delay time on drop-out is adjustable so that 30-second intervals exist between each of the relays, beginning in inverse fashion with the last relay or the second relay 84B in the element 86E in the embodiment illustrated.

Under normal operating conditions where the measured instantaneous power level is below the pre-set trip point, the +12 V on the output lead 58 is not present at trigger input leads 88 and 88' (FIG. 2) at the element 86A so that all of the time delay relays 84A and 84B are in the de-energized condition. When the measured instantaneous power level exceeds the pre-set trip point, the +12 V on the common lead 58 will be available on the lead 88 via the test switch 62 to energize the first one of the pair of time delay relays 84A and 84B in element 86A after a 5-second delay. As a result, a positive voltage will appear on lead 90 to energize a relay 92. A suppressor 91 is connected and parallel with the coil of the relay 92 to eliminate any effect that may be caused by transients. The lead 90 is also coupled to the anode of a red diode 93 in a bi-colored light-emitting diode 94 to activate it. This indicates that the first relay 84A in the element 86A has been energized for load shedding to disconnect a pre-selected load circuit 18.

The relay 92 has a pair of normally opened contacts 96, and 98. The contact 96 joined to lead 100 will be supplied with +12 V when the relay 92 is energized. This results in the activation of the second time delay relay 84B in the element 86A so that a positive voltage will appear on the lead 102 to energize a relay 104. The lead 102 is also coupled to another anode of the red diode of a bi-colored light-emitting diode to activate it as indicated by lead 106. This is to indicate that the second time delay relay 84B in the element 86A has been energized for load shedding. The relay 104 has a pair of normally opened contacts 108 and 110, the contact 108 joined to lead 112 being supplied with +12 V when the relay 104 is energized to provide a trigger input for the first relay 84A in the element 86B. The contacts 98 and 110 are connected to particular load circuits 18 as determined by the rotary switching device 16. In similar manner, all of the remaining time delay relays 84A and 84B in elements 86B through 86E are wired. While there is depicted only up to element 86E, it is to be understood that the number of elements 86 needed is that which corresponds to the number of horizontal equipment lines 78 of the matrix 68.

Thus, in operation once the trip level has been exceeded, the time delay relays of elements 86A through 86E will be progressively operated in 5-second time intervals for disconnecting the respective load circuits 18 by sequential energization of the first and second time delay relays 84A and 84B of element 86A, the first and second time delay relays 84A and 84B of element 86B, and so on. This operation for disconnecting the load circuits 18 continues until the measured instantaneous power level drops below the pre-set trip level.

Once the measured power demand has been reduced below the permissible power level, the +12 V on the lead 88 will be removed since the relay in the transducer 10 will be de-energized. This will cause any of the load circuits 18 which were disconnected to commence to be re-connected with the last time delay relay energized being the first to become de-energized, i.e., in reverse order of the energization sequence due to the adjustable setting of the time delays of the various relays in element 86 on drop-out.

The rotary switching device 16 has its input 113 connected to contacts corresponding to the output of the time delay relays 84A and 84B in elements 86A through 86E. Specifically, the normally opened contact 98 associated with the first time delay relay of element 86A is connected to the first input 113 of the switching device 16 via leads 114 and 114' (FIG. 1), and the normally opened contact 110 associated with the second time delay relay 84B of element 86A is coupled to the second input 113 of the switching device 16 via leads 116 and 116'. In similar fashion, the other contacts associated with the other time delay relays in elements 86B through 86E are tied to the other inputs 113 in the switching device 16. Each of the outputs on leads 118 of the switching device is joined to one of the load circuits 18.

The rotary switching device 16 switches sequentially all of the positions of the load circuits connected to the output leads 118 and 124 (FIG. 2) every pre-determined time interval. This interval is controlled by a timer 120 and a relay 122. Each time a pulse is received at the output of the timer 120, a solenoid 123 controlled by the relay 122 causes the wiper arms of the device 16 to rotate one position in a given direction. Thus, if a first load circuit 18 is connected to the normally opened contact 98 associated with the first time delay relay 84A of element 86A, it would therefore be the first load circuit to be shedded should the permissible power demand be exceeded. However, during the next interval the first load circuit would be switched so that it is controlled by the normally opened contact associated with the second time delay relay 84B of element 86E. Thus, in the second interval, the first load circuit would be the last one to be disconnected. Further, the second load circuit 18 would now be the first one to be disconnected and the third load circuit 18 would be the second one to be disconnected and so on sequentially down the line. In this manner, the shedding of the various load circuits 18 is done on a non-priority basis so that each of the load circuits over a pre-determined time period shares substantially the same possibility of being the first, second, third, and so on to be disconnected from the power source.

In operation, with the device 16 shown having ten inputs and ten outputs, each of the load circuits would be subject to being disconnected first only 10 percent of the time, being disconnected second only 10 percent of the time, and so on. It should be apparent that the number of inputs and outputs on the switching device 16 should correspond to the number of horizontal equipment lines 78. However, any number of inputs and outputs on the switching device can be used depending upon the number of loads desired to be sequentially switched for shedding purposes. Referring in particular to the first load circuit 18 (FIG. 2) shown in detail and which is connected to the first equipment-line 78 and the first output position of the rotary switching device 16, in the second interval the first load circuit 18 would be the last one to be dropped and in the third interval it would be the ninth one to be dropped. After each pulse from the timer 120, the wiper arms of the device 16 are progressively and sequentially rotated so that at the end of a given period of time the wiper arms will have progressed through the entire sequence of positions and return to its initial position.

Each of the load circuits 18 is controlled both by an output from the programmable matrix 68 and an output from the rotary switching device 16. The input to the first load circuit 18 is on lead 124 for receiving a positive voltage thereto either because of a desired programming or a shedding due to an excessive demand load level. In either event, a relay 126 in the load circuit 18 will become energized. The load circuit further includes relays 128, 130 and a three-pole contactor 132. When the relay 126 is energized, the normally closed contact 138 will open to turn off the green light-emitting diode 139 of the bi-colored L.E.D. 94 and normally opened contact 136 will close to supply 24 VAC to energize the relay 128. This will, in turn, cause normally closed contact 139 to open, thereby de-energizing the relay 130 which has been kept energized due to the voltage on the secondary winding of transformer 131. The relay 130 has a mechanical linkage 140 for opening the contactor 132 upon being de-energized. Therefore, power input lines 142, 144, and 146 for a power source on the input side of the contactor 132 will be disconnected to equipment 147 connected to the output lines 148, 150 and 152.

Thus, it can be seen how the selected controllable load to be connected to the power source by the programmable matrix 68 can be sequentially disconnected and reconnected by the plurality of time delay relays 84A and 84B via the rotary switching device 16. That is, each of the load circuits 18 can be disconnected from the power source in response to a signal from the time delay relays via the switching device which overrides the programming of the matrix 68. In like operation, each of the other load circuits 18 can be disconnected and reconnected to the power source as determined by the programmable matrix 68, time delay relays, 84A and 84B and the rotary switching device 16.

From the foregoing description of the energy management system embodying the present invention, it can be seen there is provided a new and improved apparatus for limiting continuously the energy consumption of a plurality of controllable loads. Further, indicating means is provided for visually displaying the operative condition of the system. The energy management system of the present invention is very efficient and effective in reducing the total cost of the electricity and maintaining efficient operating conditions.

While there has been illustrated and described what is at present to be a preferred embodiment of the present invention, it will be understood by those skilled in the art that various changes and modifications may be made and equivalence may be substituted for elements thereof without departing from the true scope of the invention. In addition, any modifications may be made to adapt a particular situation or material to the teachings of the invention without departing from the central scope thereof. Therefore, it is intended that this invention not be limited to the particular embodiment disclosed as a best mode contemplated for carrying out the invention but that the invention will include all embodiments falling within the scope of the appended claims.

What is claimed is:

1. An energy management system for limiting continuously instantaneous permissible power levels of a plurality of controllable loads on a non-priority basis comprising:

transducer means for continuously measuring instantaneous power demands of a plurality of controllable loads;

means for pre-setting an instantaneous permissible power level;

means for generating an output signal when the measured power demand exceeds the pre-set power level;

means responsive to the output signal to disconnect a sufficient number of said plurality of controllable loads in a sequential pre-determined order from an initial load to be disconnected until the measured instantaneous power demand is reduced below the pre-set permissible power level;

switching means responsive to the output signal to select the initial load to be disconnected and to randomly vary the initial load of the plurality of controllable loads that is to be selected and disconnected;

said switching means having a plurality of stationary contacts each of which is coupled to one of said plurality of controllable loads and a movable contact coupled to the output signal and movable relative to the plurality of contacts at a pre-determined rate to contact said plurality of contacts in the sequential pre-determined order; and said initial load to be disconnected being dependent on the position of said movable contact with respect to one of said stationary contacts.

2. An energy management system as claimed in claim 1, wherein said means for shedding the selected controllable loads comprises time delay relay means responsive to the output signal for disconnecting a sufficient number of said plurality of controllable loads in a sequential predetermined order until the power demand is reduced below the permissible power level.

3. An energy management system as claimed in claim 2, wherein said time-delay relay means comprises a plurality of time relays which are delayable on pull-in and are interconnected, so that the shedding in a sequential pre-determined order is in a first direction.

4. An energy management system as claimed in claim 3, further comprising means for sequentially reconnecting said selected controllable loads which were shed when the measured instantaneous power demand fell below the pre-set permissible power level.

5. An energy management system as claimed in claim 4, wherein said means for reconnecting said selected controllable loads which were shed comprises additional time delay relay means responsive to the output signal for reconnecting the loads.

6. An energy management system as claimed in claim 5, wherein said additional time delay relay means comprises a plurality of time delay relays which are delayable on drop-out and are interconnected so that sequential reconnection is in a second direction opposite to the first direction.

7. An energy management system as claimed in claim 1, wherein said means for generating the output signal comprises a timer circuit to provide pulse outputs after a pre-determined time interval.

8. An energy management system as claimed in claim 1, wherein said switching means comprises a rotary switching device.

9. An energy management system as claimed in claim 1, further including means for sequentially reconnecting said selected controllable loads which were shed when the measured instantaneous power demand drops below the pre-set power level.

10. An energy management system as claimed in claim 9, wherein said means for shedding and means for reconnecting the selected controllable loads comprises time delay relay means responsive to the output signal for sequentially shedding the sufficient number of said plurality of controllable loads in the pre-determined order and for reconnecting the plurality of controllable loads in an order reverse to the order for shedding the plurality of controllable loads.

11. An energy management system as claimed in claim 1, further including programmable means for selecting a plurality of controllable loads and periods of time in a day for which each of the selected loads are connected to a power source.

12. An energy management system as claimed in claim 11, wherein said programmable means comprises a programmable diode matrix means for selecting the controllable loads and the periods of time in a day for which each of the selected loads are to be connected to the power source.

13. An energy management system as claimed in claim 12, wherein said matrix means includes means for sequentially switching through all of the periods of time in the day to control the portion of time the selected controllable loads are connected to the power source.

14. An energy management system as claimed in claim 1, further including indicating means for visually displaying the operative conditions of whether the selected loads are connected to the power source and whether it has been shed due to the excessive power demand.

15. An energy management system as claimed in claim 14, wherein said indicating means comprises a plurality of bi-colored light-emitting diodes.

16. An apparatus for shedding a plurality of loads connected to a power source on a non-priority basis comprising:
switching means coupled to a control signal for disconnecting a selected number of plurality of loads from a power source;
said switching means sequentially disconnecting the selected number of a plurality of loads in a sequential predetermined order from an initial load in response to the control signal;
said switching means having a plurality of stationary contacts each of which is coupled to one of said plurality of controllable loads and a movable contact coupled to the control signal and movable relative to the plurality of contacts at a pre-determined rate to contact the said plurality of contacts in the sequential pre-determined order to select the initial load of the plurality of controllable loads to be disconnected and to randomly vary the initial load to be selected and disconnected; and
said initial load to be disconnected being dependent on the position of said movable contact with respect to one of said stationary contacts.

17. An apparatus as claimed in claim 16 wherein said switching means comprises a rotary switching device.

18. The energy management system of claim 1 wherein said switching means periodically connects said initial load to the power source when disconnected and sequentially disconnecting one or more loads from the plurality of loads to reduce the measured instantaneous power demand below the permissible level as required.

19. The energy management system of claim 18 wherein switching means is a rotary switching device.

20. An energy management system for limiting continuously instantaneous permissible power levels of a plurality of controllable loads on a non-priority basis comprising:
transducer means for measuring the instantaneous power demand of a plurality of controllable loads coupled to a power source,
shedding means for sequentially disconnecting a required number of the loads from the power source in a pre-determined order commencing from an initial load to be disconnected when the instantaneous power level exceeds a permissible level;
said shedding means disconnecting a sufficient number of the plurality of loads until the monitored instantaneous power demand is reduced below the permissible level;
said shedding means having timing means for periodically connecting said initial load to the power source when disconnected and sequentially disconnecting one or more additional loads from the plurality of loads to reduce the measured instantaneous power demand below the permissible level as required; and
said shedding means further including a switching means having a plurality of stationary contacts each of which is coupled to one of said plurality of controllable loads and a movable contact coupled to said timing means and movable relative to the plurality of contacts at a pre-determined rate to contact the said plurality of contacts in the sequential pre-determined order for connecting said initial load to the power source when disconnected and sequentially disconnecting one or more additional loads from the plurality of loads at regular time intervals to reduce the measured instantaneous power demand below the permissible level as required in response to movement of the movable contact.

21. The energy management system as claimed in claim 20, wherein the said switching means comprises a rotary switching device.

22. The energy management system of claim 20 wherein said shedding means randomly selects said initial load to be disconnected.

* * * * *